United States Patent [19]

Meseth

[11] Patent Number: 5,365,557
[45] Date of Patent: Nov. 15, 1994

[54] FUEL ASSEMBLY OF A NUCLEAR REACTOR WITH A GRID STRUCTURE FOR PRODUCING SPIN

[75] Inventor: Johann Meseth, Dieburg, Germany

[73] Assignee: Siemens Aktiengesellschaft, Munich, Germany

[21] Appl. No.: 75,167

[22] Filed: Jun. 10, 1993

[30] Foreign Application Priority Data

Jun. 10, 1992 [DE] Germany ............... 4219008

[51] Int. Cl.⁵ .................. G21C 3/322; G21C 3/352
[52] U.S. Cl. ................................................. 376/439
[58] Field of Search ................ 376/439, 443, 442, 441

[56] References Cited

U.S. PATENT DOCUMENTS

| | | | |
|---|---|---|---|
| 3,847,736 | 11/1974 | Bevilacqua ................ | 376/439 |
| 4,744,942 | 5/1988 | Ferrari et al. ............. | 376/442 |
| 4,913,875 | 4/1990 | Johansson et al. ......... | 376/439 |
| 5,229,068 | 7/1993 | Johansson et al. ......... | 376/439 |

FOREIGN PATENT DOCUMENTS

| | | |
|---|---|---|
| 1141033 | 12/1962 | Germany . |
| 1255122 | 11/1967 | Germany . |
| 1514558 | 6/1969 | Germany . |
| 2260593 | 7/1973 | Germany . |
| 2659634 | 7/1977 | Germany . |
| 2602487 | 4/1985 | Germany . |
| 884591 | 11/1981 | U.S.S.R. . |

Primary Examiner—Daniel D. Wasil
Attorney, Agent, or Firm—Herbert L. Lerner; Laurence A. Greenberg

[57] ABSTRACT

According to one embodiment, a fuel assembly includes a bundle of fuel rods. Approximately mutually parallel upright webs extend between the fuel rods in a plane approximately perpendicular to the fuel rods. The webs have upper edges and tabs on the upper edges. The tabs have ends and the tabs are twisted continuously more severely toward the ends away from the webs. According to another embodiment, the fuel assembly includes a bundle of fuel rods defining flow channels and an axis approximately parallel to the fuel rods. Lengthwise webs extend approximately parallel to one another between the fuel rods in a first plane extending approximately perpendicular to the fuel rods. Crosswise webs, which extend approximately perpendicularly to the lengthwise webs, are disposed in a second plane approximately parallel to the first plane and join the lengthwise webs to one another between the fuel rods. Tabs are twisted about the axis and disposed in the flow channels. The tabs are integrally formed on the lengthwise webs and they join the lengthwise webs to the crosswise webs and merge steadily with the webs.

9 Claims, 5 Drawing Sheets

FUEL ASSEMBLY OF A NUCLEAR REACTOR WITH A GRID STRUCTURE FOR PRODUCING SPIN

The invention relates to a fuel assembly with a bundle or cluster of fuel rods, and webs between the fuel rods that extend approximately parallel to one another in a plane approximately perpendicular to the fuel rods and that have tabs on their upper edge. The invention also relates to fuel assemblies in which lengthwise webs extending approximately parallel to one another and crosswise webs connecting the lengthwise webs with one another, extend between the fuel rods.

Webs with tabs are usually used in fuel assemblies for pressurized water reactors, in order to deflect a flow of coolant and liquid moderator, which is passed through interstices ("flow channels") between the fuel rods and along the rods into adjacent flow channels. As a result, mixing of the coolant flows is brought about in the various flow channels, and therefore the temperature distribution and the cooling of the rods are made uniform.

In boiling water reactors, tabs have been proposed that are curved in such a way that they each cause a spin in the coolant flow in the various flow channels. The intent of such a spin is to attain separation of the liquid/-steam mixture, particularly in the upper portion of the fuel assembly, where a considerable portion of the coolant is in the form of steam, with the liquid being spun outward, or in other words toward the hot fuel rods, while the steam in the middle of the flow channel is carried away at a high speed.

Such spin-generating tabs may be provided on the webs of spacers, on which the fuel rods of the bundle or cluster are supported through protrusions and/or springs, or on the webs of grids, which serve merely as carriers of such spin generators, and therefore at most have protrusions of the webs that prevent contact between the tabs and the fuel rods, without effecting a fast contact of the fuel rods with the webs.

It is accordingly an object of the invention to provide a fuel assembly of a nuclear reactor with a grid structure for producing spin, which achieves the maximum possible spin with the maximum possible effective separation of vapor bubbles and liquid droplets, without overly severely hindering the mixture of liquid and steam flowing along the fuel rods and which does so in a structurally simple way.

With the foregoing and other objects in view there is provided, in accordance with the invention, a fuel assembly, comprising a bundle of fuel rods; approximately mutually parallel upright webs extending between the fuel rods in a plane approximately perpendicular to the fuel rods; the webs having upper edges and tabs on the upper edges, the tabs having ends, and the tabs being twisted continuously or increasingly more severely toward the ends relative or as compared to the webs.

With the objects of the invention in view, there is also provided a fuel assembly, comprising a bundle of fuel rods defining flow channels and an axis approximately parallel to the fuel rods; lengthwise webs extending approximately parallel to one another between the fuel rods in a first plane extending approximately perpendicular to the fuel rods; crosswise webs being disposed in a second plane approximately parallel to the first plane and joining the lengthwise webs to one another between the fuel rods; and tabs being twisted about the axis and disposed in the flow channels, the tabs joining the lengthwise webs to the crosswise webs and merging steadily with the webs at a twisting of 90° relative to the webs.

The invention assumes that the least possible spin is to be generated in the flow of liquid, in order to minimize any pressure loss caused thereby. Nevertheless, in order to promote the separation of liquid and steam, high spin must be imposed on the flowing mixture of liquid and steam.

Only a slight spin is therefore generated in the regions near the fuel rods, where the water collects, or in the regions of the webs, where the liquid in the coolant flow is still poorly separated from the steam, but this slight spin is increased more and more in the course of the tab, in order to separate the mixture of liquid and steam there.

The invention therefore provides for the tabs to be initially only slightly twisted, but for them to be twisted continuously more and more markedly relative to the web toward their end.

In accordance with another feature of the invention, in order to avoid "dead zones" downstream in terms of the flow in the twisted tabs, the variation in the flow direction at the transition from the webs to the tabs is made continuously and gently and not in the form of a sharp bend.

Advantageously, the tabs are twisted so severely that they have tab parts which are at right angles to the webs. The ends of the tabs are accordingly twisted through 90°, 270° and 350° (in general, $n \times 180° - 90°$), for instance, relative to the web. These tab parts merge with web parts, which are welded on as separate parts or in particular are formed integrally onto the tabs, or in other words can be stamped out of a metal sheet together with the tabs and the web. The tab parts of the tabs of adjacent webs may be welded together, in order to form crosswise webs for connecting the adjacent webs parallel to one another. This creates a grid structure, which intrinsically is formed only of stamped-out lengthwise webs that are disposed in one web plane, but these lengthwise webs are joined, in a second plane located above that plane, by crosswise webs that are formed of the afore-mentioned, welded-together tab parts.

Thus, the lengthwise webs, on their side facing away from the flow direction, merge with the twisted tabs to become cross-wise webs. As a result, the number of sheet-metal parts to be stamped out is reduced, while the number of weld points remains practically the same as compared with a lattice-like grid that is manufactured in the prior art from lengthwise and crosswise webs that are inserted into one another and welded together.

In accordance with a further feature of the invention, the twisting is made easier if the tabs taper continuously toward their end. However, this tapering is especially advantageous because as a result the broad parts of the tabs, which extend up to the vicinity of the fuel rods, protrude with only moderate twisting into the liquid collected there. In other words, there is little disturbance (little pressure loss) in the liquid flow. However, the more severely twisted ends of the tabs impose a more severe spin upon the steam flowing in the center of the flow channels, thereby providing the rest of the separation of the liquid.

In accordance with an added feature of the invention, if this kind of grid structure is used as a spacer, then support elements are necessary to support the fuel rods. To that end, the part of a web extending between two fuel rods has two protrusions formed from the web part, on which protrusions one of the two fuel rods is supported, and a spring, on which the other fuel rod is supported.

In accordance with a concomitant feature of the invention, the fuel rods, particularly in fuel rod assemblies for boiling water reactors, are seated in square holes in an imaginary grid, or in a spacer formed of crosswise and lengthwise webs in the holes of the spacer grid. The spin generators are then provided in flow channels formed by four adjacent fuel rods, or in other words at the intersections of the grid. With adjacent intersection points carrying tabs, the two tabs are advantageously twisted in mirror fashion relative to one another. This creates a checkerboard-like pattern of flows in the square grid, with the flows alternatingly rotating clockwise and counterclockwise. At the constrictions between two adjacent fuel rods, or in other words at the transitions between two flow channels, the tangential direction of the two spinning flows is therefore made to turn in the same direction, so that the two spinning flows do not slow one another down.

Other features which are considered as characteristic for the invention are set forth in the appended claims.

Although the invention is illustrated and described herein as embodied in a fuel assembly of a nuclear reactor with a grid structure for producing spin, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 6:
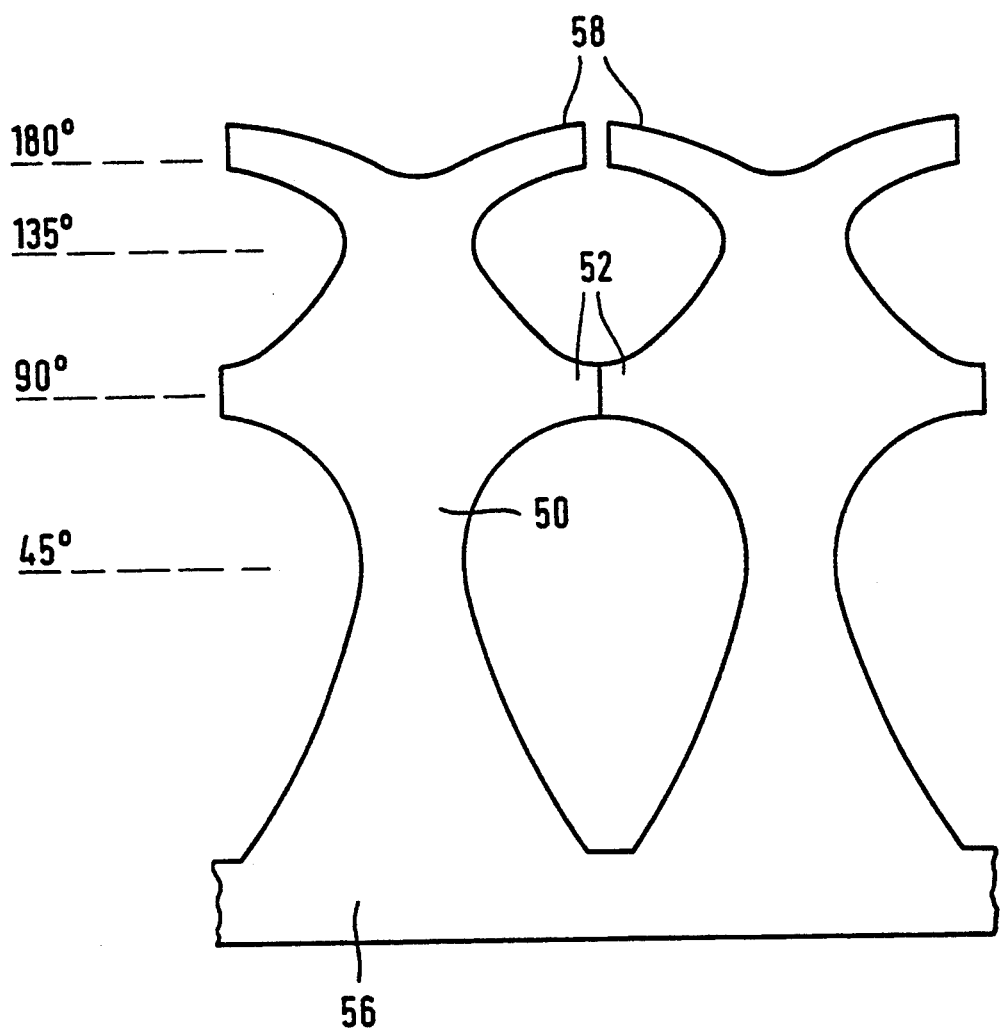
Figure 7:
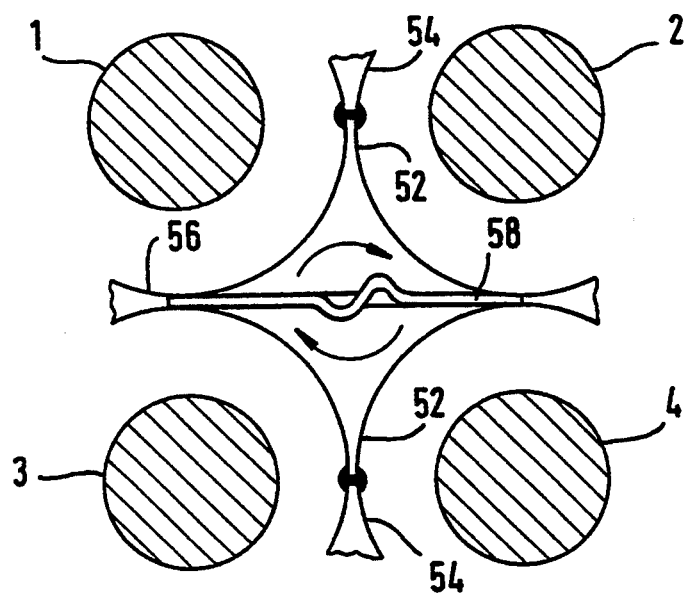
Figure 8:
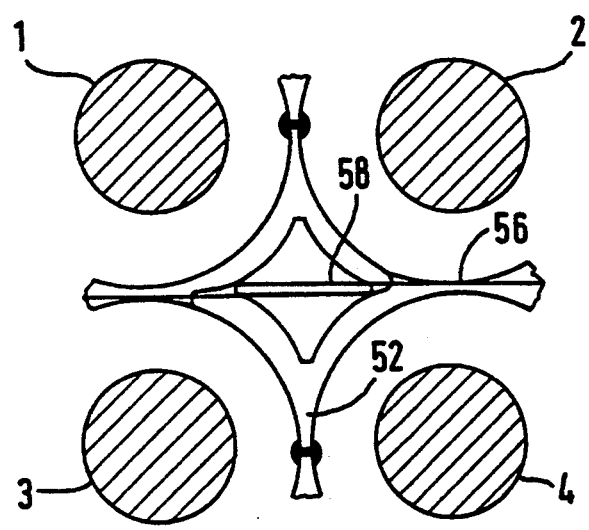

FIGS. 6 and 7 are respective fragmentary, elevational and plan views of the untwisted lengthwise web and a twisted tab with twisting through 180°; and FIG. 8 is a plan view of a tab that is twisted through 360°.

Figure 1:
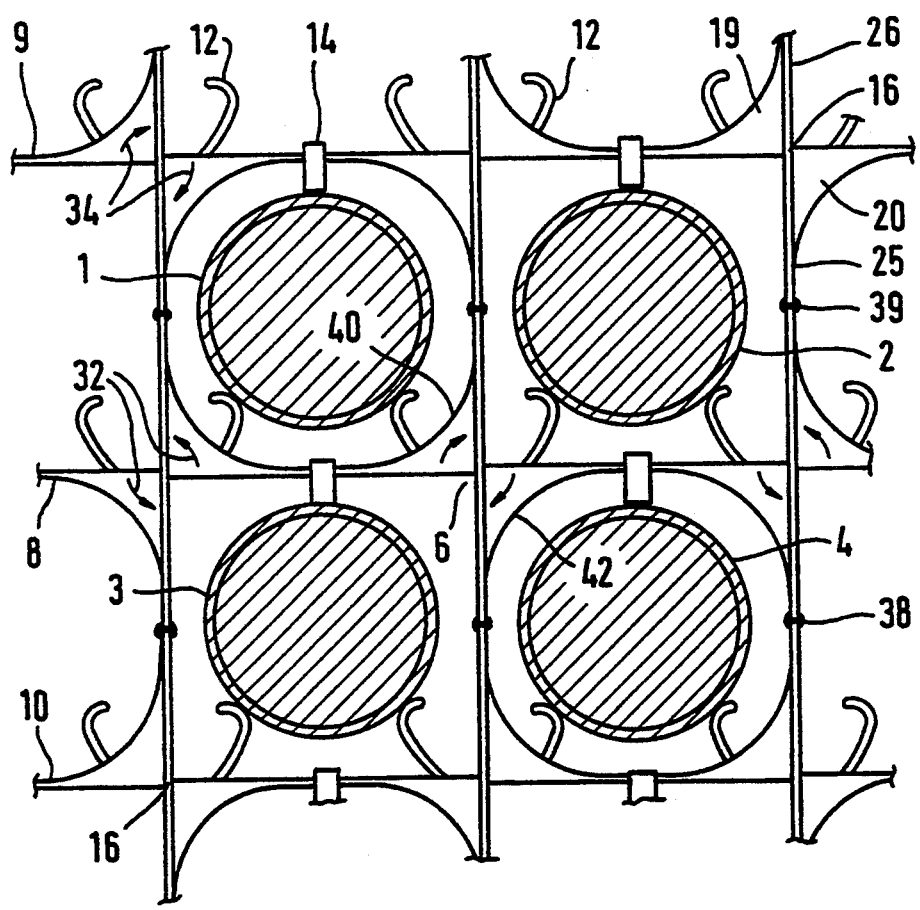
FIG. 1 is a fragmentary, diagrammatic, cross-sectional view of a region including four fuel rods in a spacer according to the invention.

Referring now to the figures of the drawing in detail and first, particularly, to FIG. 1 thereof, there are seen four fuel rods 1, 2, 3, 4 that define a flow channel 6, and a lengthwise web 8 extending between them, to which further lengthwise webs 9 and 10 are parallel.

Lateral protrusions in the form of bent-out sheet--metal strips 12, on which the fuel rods 1 and 2 are supported, are formed from the sheet metal of the web. In order to support the fuel rods 3 and 4, the lengthwise web has one spring 14 each.

Reference numeral 16 indicates a lengthwise axis of the flow channel, which at the same time forms the center axis of a twisted tab having parts located on either side of the center axis that are indicated by reference numerals 19 and 20.

Figure 2:
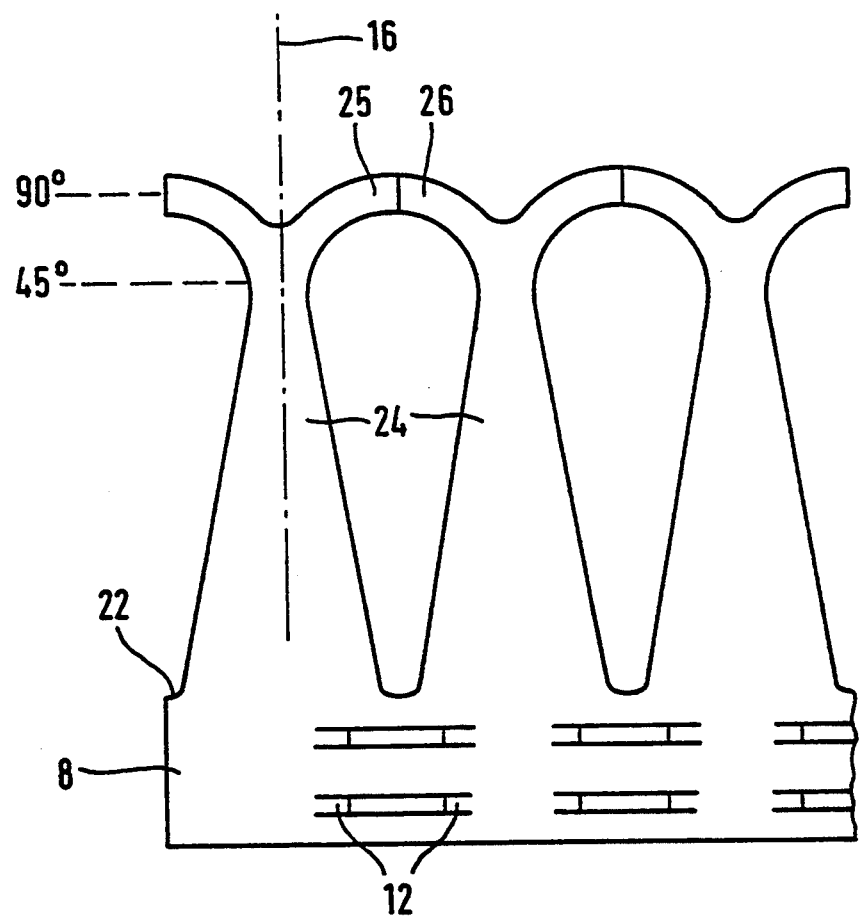
FIG. 2 is an enlarged, fragmentary, elevational view of part of a lengthwise web that is stamped from a metal sheet, with tabs that have not yet been twisted.

As FIG. 2 shows, the lengthwise web is stamped from a metal sheet and has tabs 24 on an upper edge 22 thereof that taper toward their end. Web parts 25, 26 are formed onto this tapered end.

Figure 3:
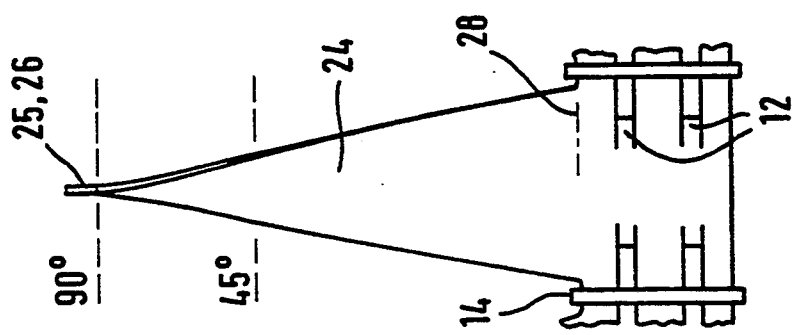

The tabs are then twisted relative to the plane of the web in such a way that their ends are at right angles to the web, as is seen in FIG. 3. A sharp bend at an upper edge 28 of the web is avoided. Instead, the web in this case merges steadily and slowly with the tab. The angle of twisting of the tab relative to the web increases out of proportion to the distance from the upper edge of the web.

Figure 5:
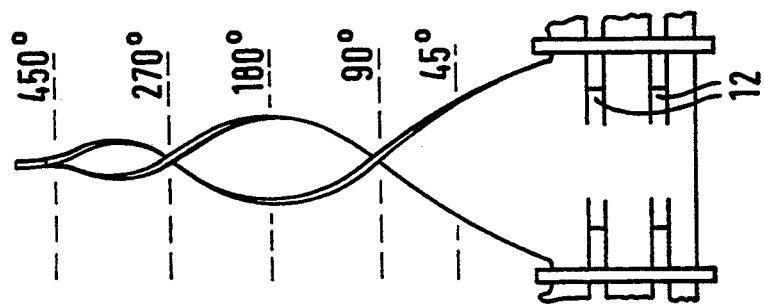
FIGS. 3 to 5 are fragmentary, elevational views of the same lengthwise web with twisting of the tabs through 90°, 270° and 450°.
Figure 4:
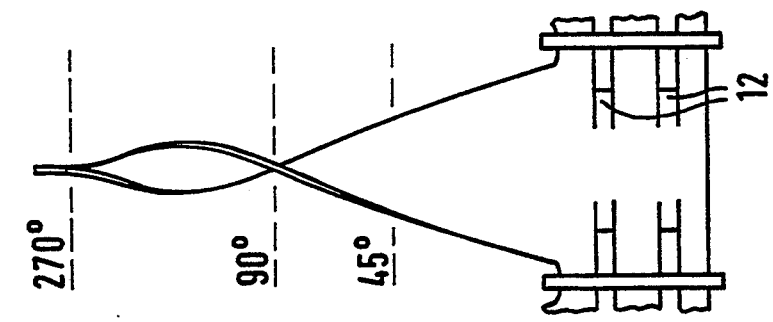

This continuously more-severe twisting is shown quite clearly in FIGS. 4 and 5, in each of which planes are shown at which a twisting of 90°, 180°, and 270° is attained.

Arrows 32 and 34 shown in FIG. 1 indicate the direction of rotation of the twisting. It can be assumed that the fuel rods are disposed in square holes in an imaginary grid and that the tabs are disposed at intersections of the grid. At adjacent intersections carrying the tabs, the tabs of these two intersections are twisted in mirror fashion relative to one another, as is indicated by the arrows 32, 34. Reference numerals 38, 39 indicate weld seams, with which the web parts of the tabs that are perpendicular to the lengthwise webs are connected to the corresponding web parts on the tabs of adjacent lengthwise webs. In the embodiment shown in FIG. 1, only the maximum twisting angle of 90° shown in FIG. 3 has been made. A contour of side edges 40, 42 of the tabs is selected in such a way that after the twisting, a practically constant spacing relative to the fuel rods results.

FIG. 6 shows a part of a web 56 before its twisting, having tab parts 50 which merge with web parts 52, that are located in a plane in which twisting through 90° relative to the web 56 is attained. The web parts 52 are welded together with the web parts 54 of the tabs of adjacent webs to make a crosswise web, as is seen in FIG. 7.

The tabs of the webs 56 still have free ends 58, which extend into a plane in which the twisting amounts to 180°. The contour of the tabs is selected in such a way that after the twisting, an annular space of constant width is produced between the tabs and the fuel rods.

FIG. 8 shows tabs with a twisting of 360°. In this case two helical windings of the twisted tab face one another in each quadrant of the flow channel, but their inclination decreases continuously, because of the increasing twisting toward the tab ends. The contour of the tab is selected in such a way that the lower winding leaves a narrower annular space free around the fuel rods, while the upper winding leaves a broader annular space free around these rods.

The invention accordingly imposes an intensive spin upon a coolant flow in the various flow channels. In the process, however, the liquid is forced into the region adjacent the fuel rods, where it is needed to cool the fuel rods, and is made only slightly turbulent. There, only a slight tangential speed occurs with only slight flow resistance. However, the steam flows, virtually decoupled from the liquid flow, with a tolerable pressure loss through the center of the flow channel. Since the steam can attain high speeds and is removed quickly, the volumetric proportion of the liquid increases, and therefore the moderation of the neutrons increases as well. As a result, with pronounced cooling, good utilization of the fuel is achieved.

I claim:

1. A fuel assembly, comprising:
a bundle of fuel rods;
approximately mutually parallel upright webs extending between said fuel rods in a plane approximately perpendicular to said fuel rods;
said webs having upper edges and tabs on said upper edges, each of said tabs having an end, and each of said tabs being twisted toward said end about an axis approximately parallel to said fuel rods; and
said tabs tapering continuously up to a twisting of 45° relative to said webs.

2. The fuel assembly according to claim 1, including crosswise webs joining said ends of said tabs of adjacent webs of one another, said tabs having tab parts being twisted by 90° relative to said webs, and said tab parts merging with said crosswise webs.

3. The fuel assembly according to claim 1, wherein said tab parts of said tabs of adjacent webs have formed-on web parts, and said crosswise webs are formed by welding said web parts together.

4. The fuel assembly according to claim 1, wherein one of said webs has a part extending between two of said fuel rods with two protrusions formed from said web, one of said two fuel rods is supported on said protrusions, and including a spring on which the other of said two fuel rods is supported.

5. The fuel assembly according to claim 1, wherein said fuel rods are disposed in square holes in a grid having intersections, said tabs are disposed at least at some of the intersections, and said tabs at two adjacent intersections carrying said tabs are twisted in mirror fashion relative to one another.

6. The fuel assembly according to claim 1, wherein said tabs have a width being dependent on a spacing from said upper edges of said tabs.

7. A fuel assembly, comprising:
a bundle of fuel rods;
approximately mutually parallel upright webs extending between said fuel rods in a plane approximately perpendicular to said fuel rods;
said webs having upper edges and tabs on said upper edges, each of said tabs having an end, and each of said tabs being twisted toward said end about an axis approximately parallel to said fuel rods; and
crosswise webs joining said ends of said tabs of adjacent webs to one another, said tabs having tab parts being twisted by 90° relative to said webs, and said tab parts merging with said crosswise webs.

8. The fuel assembly according to claim 7, wherein said tab parts of said tabs of adjacent webs have formed-on web parts, and said crosswise webs are formed by welding said web parts together.

9. A fuel assembly, comprising:
a bundle of fuel rods;
approximately mutually parallel upright webs extending between said fuel rods in a plane approximately perpendicular to said fuel rods;
said webs having upper edges and tabs on said upper edges, each of said tabs having an end, and each of said tabs being twisted toward said end about an axis approximately parallel to said fuel rods;
one of said webs having a part extending between two of said fuel rods with two protrusions formed from said web, one of said two fuel rods being supported on said protrusions; and
a spring on which the other of said two fuel rods is supported.

* * * * *